Oct. 21, 1941. R. D. HURST 2,260,030
SOLDERING IRON APPARATUS
Original Filed July 17, 1939 2 Sheets-Sheet 1
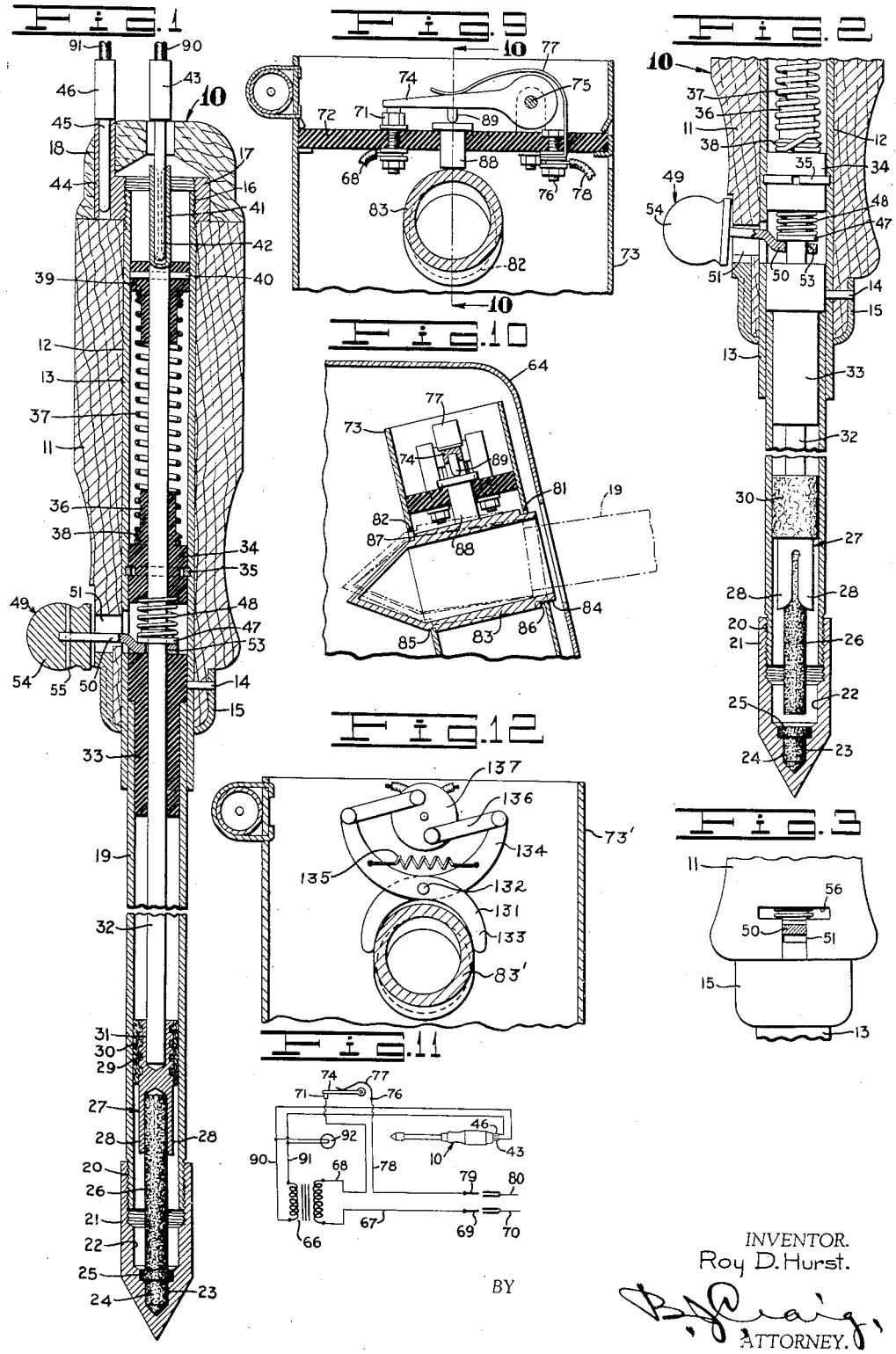
INVENTOR.
Roy D. Hurst.
BY
ATTORNEY.

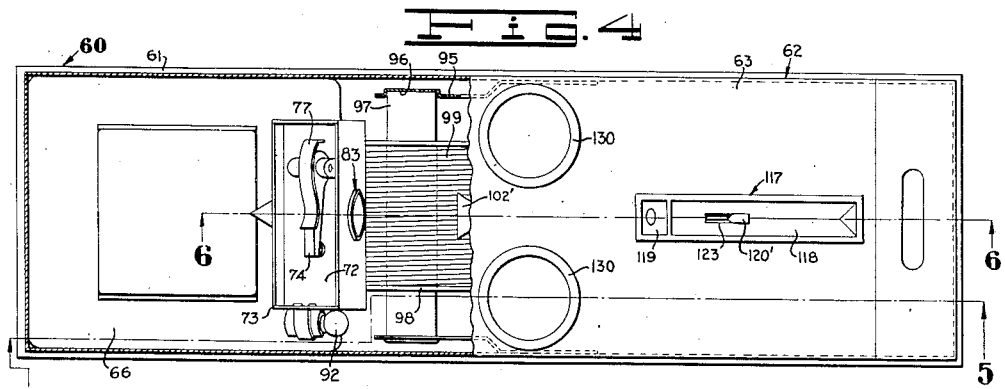
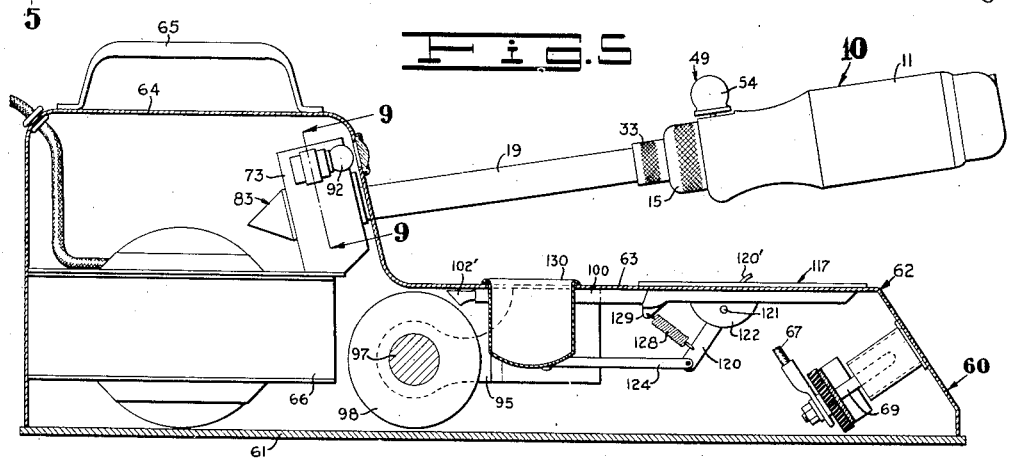
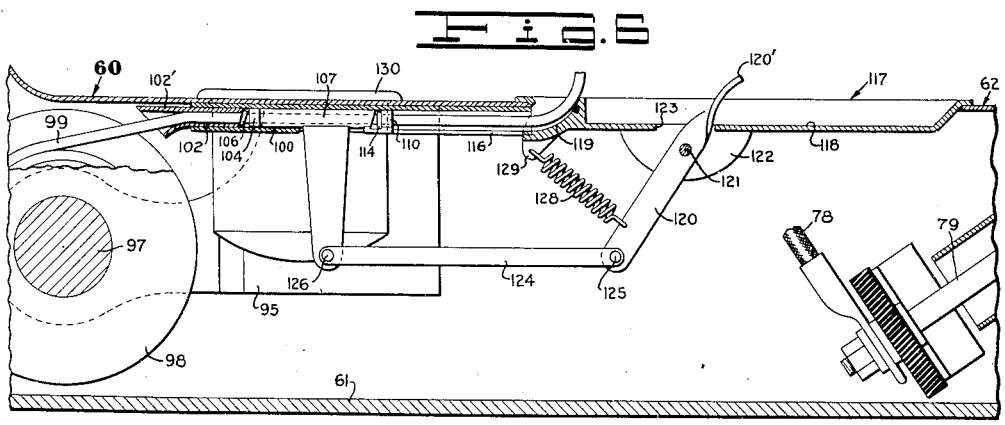
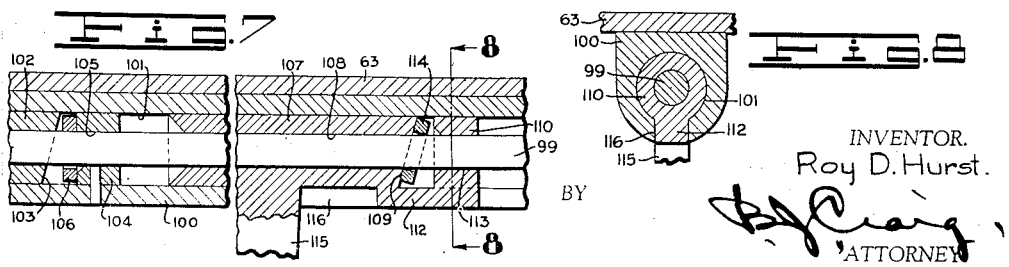

Patented Oct. 21, 1941

2,260,030

UNITED STATES PATENT OFFICE 2,260,030

SOLDERING IRON APPARATUS

Roy D. Hurst, Los Angeles, Calif.

Substitute for application Serial No. 285,054, July 17, 1939. This application December 6, 1940, Serial No. 368,900

10 Claims. (Cl. 219—26)

This invention relates to soldering irons.

The general object of the invention is to provide an improved electrically heated soldering iron and support.

A more specific object of the invention is to provide a novel electrically heated soldering iron.

An additional object of the invention is to provide a novel soldering iron support.

A further object of the invention is to provide a novel carbon advancing device for use with a soldering iron.

Another object of the invention is to provide a novel means for controlling a flow of current to the heating apparatus of a soldering iron.

A further object of the invention is to provide a novel solder advancing mechanism built into a soldering iron support.

Other objects and the advantages of this invention will be apparent from the following description taken in connection with the accompanying drawings, wherein:

Fig. 1 is a central sectional view through a soldering iron including the features of my invention;

Fig. 2 is a fragmentary view similar to Fig. 1 with parts in elevation;

Fig. 3 is a fragmentary top plan view, partly in section, showing the control;

Fig. 4 is a plan view with parts broken away showing the support;

Fig. 5 is a section taken on line 5—5, Fig. 4 and showing the soldering iron in place;

Fig. 6 is an enlarged section taken on the plane of line 6—6, Fig. 4;

Fig. 7 is a fragmentary central sectional view showing the solder feed device;

Fig. 8 is a section taken on line 8—8, Fig. 7;

Fig. 9 is a section taken on line 9—9, Fig. 5;

Fig. 10 is a section taken on line 10—10, Fig. 9;

Fig. 11 is a wiring diagram; and

Fig. 12 is a view similar to Fig. 9 showing a modified switch mechanism.

This application is a substitute for my prior application Serial No. 285,054, filed July 17, 1939.

Referring to the drawing by reference characters I have shown my invention as embodied in a soldering iron which is indicated generally at 10. As shown the iron includes a handle 11 which has a central bore 12 in which a sleeve 13 is arranged. The sleeve is held in place by a pin 14 which passes through the sleeve and through the handle and extends through a ferrule 15. At its rear end the sleeve 13 is threaded at 16 and engages a threaded metallic collar 17 suitably secured in a closure cap 18.

The sleeve at its forward end has a tube 19 suitably secured thereto. The tube 19 includes a threaded outer end 20 which receives a threaded copper cap 21 which has an internal recess 22 and a reduced recess 23. A carbon member 24 is fixed in the recess 23 and includes an enlarged shoulder portion 25 adapted to be engaged by a carbon rod 26 mounted in a holder 27 which has resilient spring jaws 28.

The holder has a grooved rear portion 29 which is engaged by suitable packing means 30 which may be made of asbestos fiber and which slides along the tube 19. The holder end remote from the jaws 28 has a bore 31 which receives a reciprocating hollow rod 32 which slides through an insulating sleeve 33 which engages the adjacent portions of the sleeve 13 and the tube 19. A second insulating sleeve 34 surrounds the rod 32 and engages the interior of the sleeve 13. A split locking spring 35 engages a groove in the sleeve 34 and a groove on the inner wall of the tube 13 to hold the sleeve in place. The sleeve 34 includes a reduced portion 36 on which a spring 37 is held by lips 38 which engage between the coils of the spring. The spring 37 also engages a sliding member 39 and pulls this member towards the head of the soldering iron. The sliding member 39 is secured to the rod 32 by a rawhide pin 40 as shown in Fig. 1 which acts as a securing and insulating member.

The construction is such that the spring 37 urges the rod 32 towards the head so that the movable carbon 26 is urged into contact with the fixed carbon 24.

The reciprocating rod 32 at the rear end includes spring jaws 41 to slidably receive the end 42 of a removable terminal 43.

The metallic collar 17 has an integral hollow base 44 thereon which passes through the cap 18 and receives the tip 45 of a removable terminal 46.

When the current is on the circuit is completed through the tip 45 to the collar 17, thence through the sleeve 13, tube 19, cap 21 and fixed carbon 24, thence to the movable carbon 26, the holder 27, rod 32 and to the terminal 43. The portions 30, 33, 34, and 39 serve to insulate the parts.

The rod 32 is provided with a collar 47 which is slidable thereon and which is engaged by one end of a spring 48 with the other end of the spring engaging the end of the sleeve 34.

A control member 49 includes an end portion 50 which extends through a slot 51 in the handle 11 and which has an aperture 53 receiving the rod 32. The collar 47 engages one face of the control member and normally holds it against the insulating sleeve 33. The control member includes an operating knob 54 which is held in place by a pin 55. The diameter of the aperture 53 is slightly larger than the diameter of the rod 32 so that the spring 37 normally urges the rod 32 through the control member. The construction is such however that when the control member knob 54 is moved rearwardly the body of the control member tilts causing the wall of the aperture 53 to first bind against the rod 32 after which further movement of the knob 54 moves the rod 32 with it to the position shown in Fig. 2 where the movable carbon is spaced from the fixed carbon so that the circuit is broken and the heating effect ceases.

As shown in Fig. 3 the slot 51 includes offset ends 56 which form a bayonet joint permitting the control member to move to either side thus locking the movable carbon spaced from the fixed carbon. Movement of the knob 54 is resisted by the spring 48 which must be compressed to allow the knob to be moved to circuit interrupting position and which serves to move the control member to normal operative position when the portion 50 is aligned with the slot 51.

The support member indicated generally at 60 includes a base 61 and a housing 62. The housing includes a shallow front portion 63 and a deeper rear portion 64 with a handle 65 mounted on the portion 64 so that it is adjacent the center of gravity of the apparatus so that it may be readily transported.

Mounted within the housing 62 I show a transformer 66 from which a pair of leads 67 and 68 extend. The lead 67 includes a terminal 69 adapted to be connected to one side of a source of current supply indicated at 70. The lead 68 is connected to a contact 71 mounted on an insulated block 72 supported in an inner housing 73 which is shown as mounted on the transformer 66. The contact 71 is in the path of movement of a circuit closing arm 74 which is pivoted at 75 on the block 72. The block 72 includes a binding post 76 which supports a spring 77 which normally urges the arm 74 against the contact 71. The spring 77 is connected through the binding post to a lead 78 which is connected to a terminal 79 which is adapted to engage the other side of the line at 80.

The inner housing 73 is provided with aligned apertures 81 and 82 through which a head receiving support 83 extends. The support includes reduced portions 84 and 85 which provide shoulders 86 and 87. The reduced portions 84 and 85 are of such size that they allow the head receiving support to shift from the full line position shown in Fig. 10 to the broken line position shown in this figure. The support normally assumes the full line position when the iron 10 is removed. When the iron is in place as shown in Fig. 10, the iron assumes the dotted line position shown in this figure and pushes upwardly on a sliding post 88 causing the latter to engage a pin 89 made of fiber or other insulating material and mounted on the arm 74. This action breaks the primary or 110 volt circuit to the transformer. The transformer 66 is connected by leads 90 and 91 to the terminals 43 and 46, previously mentioned. The leads 90 and 91 are also connected to a lamp 92 which is illuminated when the transformer is operating.

Within the portion 63 of the housing 62 I provide a pair of spaced spring arms 95 which at one end are suitably secured to the sides of the housing. Adjacent their free ends the arms 95 each includes a recessed portion 96 to receive a wooden rod 97.

A standard type spool of solder 98 is arranged on the rod 97 and is rotatable thereon. The solder spool 98 has a length of wire solder 99 wound thereon.

Depending from the top of the housing portion 63 I provide a housing 100 which has a bore 101 therethrough. At one end of the housing 100 a tube 102 is positioned in the bore 101 and one end of the tube 102 is preferably outwardly flared as at 102' and the other end of the tube is bevelled as indicated at 103. Spaced a predetermined distance from the end 103 of the tube 102 the bore 101 has a fixed collar 104 therein having an aperture 105 therethrough. Positioned between the tube end 103 and the collar 104 I provide a washer 106.

Positioned in the bore 101 I provide a feeder member 107 which has a bore 108 therethrough. The end of the feeder 107 remote from the collar 102 is bevelled as indicated at 109. Spaced from the end 109 the feeder includes a collar portion 110 connected to the feeder by an integral lip 112. The collar portion 110 has a bore 113 therethrough aligned with the bore 108. Positioned between the collar portion 110 and the end 109 I provide a washer 114.

The feeder 107 includes a depending arm 115 which is positioned in a slot 116 in the bottom of the housing 100. Positioned on the housing portion 63 I provide a plate member 117 which has a trough portion 118 extending through a suitable aperture in the top of the portion 63. At one end the plate 117 includes a guide portion having a recess 119 therein which communicates with the bore 101 of the housing 100.

Intermediate the length of the trough 118 I provide a lever 120 which is pivoted intermediate its length as at 121 to bearing portions 122. The upper end of the lever extends through an aperture into and above the trough and is twisted to a position at right angles to the lower portion as at 120'. Adjacent the lower end of the lever 120 one end of a bar 124 is pivotally secured thereto as at 125. The opposite end of the bar 124 is pivotally connected as at 126 to the arm 115 of the feeder 107.

One end of a coiled spring 128 is connected to the lever 120 and the opposite end is anchored to a lip 129 on the guide portion of the plate 117.

In operation the solder 99 is threaded through the tube 102, the washer 106, the collar bore 105, the feeder bore 108, the washer 114 and through the bore 113 of the collar 110 and is extended through the housing bore 101 into the guide recess 119 of the plate member 117.

When an operator wishes to extrude a length of solder and has the soldering iron in his hand he places the tip of the iron against the portion 120' of the lever 120 and pushes the portion 120' towards the enlarged portion 64 of the casing. As the lever 120 is thus moved the feeder member 107 moves towards the plate 117 and as it moves the bevelled face 109 tilts the washer 114 clamping it on the solder and further movement of the feeder 107 carries the solder with it. (See Fig. 7.) When the operator removes the iron from the portion 120' of the lever 120 the spring 128 returns the lever to its normal position as shown in Fig. 6.

As the feeder member 107 begins to return to its normal position the flat face of the collar portion 110 engages the washer 114 and straightens it up thereby releasing its grip on the solder. Any rearward movement of the solder will move the washer 108 against the bevelled face 103 of the tube 102 which will tilt the washer and cause it to grip the solder thereby preventing further rearward movement of the solder.

Positioned one on each side of the housing 100 I provide a pair of cup members 130 which are positioned in suitable apertures in the top of the portion 63 of the housing. The cup members 130 are adapted to receive a quantity of soldering flux.

In Fig. 12 I have shown a modified switch mechanism mounted on an inner housing 73' similar to the housing 73 and controlled by a movable head receiving support 83' similar to the support 83. A pair of arms 131 are pivotally attached to the housing 73' as at 132 and have lower portions 133 engaging the support 83' and upper portions 134 urged together by a spring 135. A pair of arms 136 are pivotally connected to the extremities of the portions 134 and are also pivotally connected to a rotatable switch 137 in such a manner that the switch 137 is operated when the iron 10 is inserted into the support 83'.

Having thus described my invention, I claim:

1. In a soldering iron, a hollow handle, a hollow electrical conducting tubular member mounted in said handle and projecting therefrom, a metal head on said member, a carbon in said head, a shiftable rod in said member, a second carbon on said rod, means to urge said rod towards said head, and a control member tiltable on said rod, said control member having a hole slightly larger than said rod and receiving said rod.

2. In a soldering iron, a hollow handle, a hollow electrical conducting tubular member mounted in said handle and projecting therefrom, a metal head on said member, a carbon in said head, a rod slidable in said tubular member, a holder, mounted on said rod, packing means about the holder and engaging the interior of the tubular member, said holder including resilient jaws, a carbon in said jaws, means to urge said rod towards said head, a conductor engaging said tubular member, and a second conductor engaging said rod.

3. In a soldering iron, a hollow handle, a hollow electrical conducting tubular member mounted in said handle and projecting therefrom, a metal head on said member, a carbon in said head, a rod slidable in said tubular member, a holder on said rod, a carbon in said holder, means to urge said rod towards said head, a conductor engaging said tubular member, a second conductor engaging said rod, and a control member tiltably mounted on said rod and movable on the handle, said control member having a hole slightly larger than said rod and receiving said rod.

4. In a soldering iron, a hollow handle, a hollow electrical conducting tubular member mounted in said handle and projecting therefrom, a metal head on said member, a carbon in said head, a hollow insulating sleeve in said member, a rod slidable through said sleeve, a holder slidable on said rod and insulated from said tubular member, said holder having means thereon for engaging a carbon, a second hollow insulating sleeve in said tubular member, said rod extending through said second sleeve, and means to urge said rod towards said head.

5. In a soldering iron, a hollow handle, a hollow electrical conducting member mounted on said handle, a hollow metal head on said member, a carbon removably mounted in said head, a metal rod mounted to reciprocate in said body, said rod having a metal carbon holder thereon, means to insulate said rod and holder from said member and head, means constantly urging said rod towards said head, an operating member including a portion engaging said rod for shifting said rod away from said head, a cap on said handle, said cap having an aperture, a contact slidable through said cap aperture and having an end portion fitted in said rod, and a second contact mounted on said hollow member.

6. In a soldering iron, a hollow handle, a hollow electrical conducting member mounted on said handle, a hollow metal head on said member, a carbon removably mounted in said head, a metal rod mounted to reciprocate in said body, said rod having a metal holder thereon, means to insulate said rod and holder from said member and head, said holder including resilient portions, a second carbon engaged by said resilient portions and disposed adjacent the first carbon, means constantly urging said rod towards said head, an operating member on said handle, said operating member including a portion engaging said rod for shifting said rod away from said head, means to hold the operating member with the rod away from the head, a cap on said handle, said cap having an aperture, a contact slidable through said cap aperture and having an end portion fitted in said rod, and a second contact mounted on said hollow member.

7. In a soldering iron, a hollow handle, a hollow electrical conducting tubular member mounted in said handle and projecting therefrom, a metal head on said member, a carbon in said head, a hollow insulating sleeve in said member, a rod slidable through said sleeve, a holder slidable on said rod and insulated from said tubular member, said holder having means thereon for engaging a carbon, a second hollow insulating sleeve in said tubular member, said rod extending through said second sleeve, means to urge said rod towards said head, a cap on said handle, a metal collar in said cap and engaging said member, a conductor terminal engaging said collar, a second terminal engaging said rod, a collar slidable on said rod and disposed between said first sleeve and said second sleeve, a spring about said rod and engaging said collar and said second sleeve, said handle having an aperture and a control member extending through said aperture, said control member including a body between said collar and first sleeve member, said body having a hole slightly larger than said rod and receiving said rod.

8. In a soldering iron, a hollow handle, a hollow electrical conducting member mounted in said handle and projecting therefrom, a metal head on said member, a carbon in said head, a hollow insulating sleeve in said member, a rod slidable through said sleeve, a holder on said rod, said holder being slidable within and insulated from said sleeve, said holder having means thereon for engaging a carbon, a carbon engaged by said means, a second hollow insulating sleeve in said member, said rod extending through said second sleeve, means to urge said rod towards said head, a cap on said handle, a metal collar in said cap and engaging said hollow member, a conductor terminal engaging said collar, a second terminal engaging said rod and slidable through said cap, a collar slidable on said rod and disposed between said first sleeve and said second sleeve, a spring about said rod and engaging said collar and second sleeve, a control member on said handle, said control member having a hole slightly larger than said rod and receiving said rod, said control member being disposed between said collar and said first sleeve and a knob on said control member.

9. In a soldering iron, a hollow handle, a hollow electrical conducting member mounted in said handle and projecting therefrom, a metal head on said member, a carbon in said head, a hollow insulating sleeve in said member, a rod slidable through said sleeve, a holder on said rod, said holder being slidable within and insulated from said sleeve, said holder having means thereon for engaging a carbon, a carbon engaged by said means, a second hollow insulating sleeve in said member, said rod extending through said second sleeve, a sliding member within said hollow member and secured to said rod and spaced from said second sleeve, a spring having one end secured to said second sleeve and the other end secured to said sliding member, said spring urging said rod towards said head, a cap on said handle, a metal collar in said cap and engaging said hollow member, a conductor terminal engaging said collar, a second terminal engaging said rod and slidable through said cap, a collar slidable on said rod and disposed between said first sleeve and said second sleeve, a spring about said rod and engaging said collar and said second sleeve, said handle having an aperture, a control member extending through said aperture, said control member having a hole slightly larger than said rod and receiving said rod, said control member being disposed between said collar and said first sleeve and a knob on said control member.

10. In a soldering iron, a hollow handle, a hollow electrical conducting member mounted on said handle, a hollow metal head on said member, a carbon removably mounted in said head, a metal rod mounted to reciprocate in said body, said rod having a metal carbon holder thereon, means to insulate said rod and holder from said member and head, an operating member for shifting said rod away from said head, an end member on said handle, said end member having an aperture, a contact slidable through said aperture and having an end portion engaging said rod, and a second contact mounted on said hollow member.

ROY D. HURST.